United States Patent
Giampaolo et al.

(10) Patent No.: US 8,984,029 B2
(45) Date of Patent: Mar. 17, 2015

(54) FILE SYSTEM MANAGEMENT

(75) Inventors: Dominic B. Giampaolo, Mountain View, CA (US); Pavel Cisler, Los Gatos, CA (US); Eric Weiss, Paris (FR); Kristen A. McIntyre, Fremont, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 13/350,047

(22) Filed: Jan. 13, 2012

(65) Prior Publication Data

US 2012/0185518 A1    Jul. 19, 2012

Related U.S. Application Data

(60) Provisional application No. 61/433,180, filed on Jan. 14, 2011.

(51) Int. Cl.
    *G06F 12/00* (2006.01)
    *G06F 17/30* (2006.01)

(52) U.S. Cl.
    CPC .............................. *G06F 17/30115* (2013.01)
    USPC ........... 707/821; 707/826; 707/831; 711/162; 711/170

(58) Field of Classification Search
    CPC ............ G06F 17/30067; G06F 3/0643; G06F 17/30115; G06F 21/552
    USPC ......................................... 707/821
    See application file for complete search history.

(56) References Cited

U.S. PATENT DOCUMENTS

| | | |
|---|---|---|
| 5,150,407 A | 9/1992 | Chan |
| 5,150,473 A | 9/1992 | Zulch |
| 5,163,148 A | 11/1992 | Walls |
| 5,276,867 A | 1/1994 | Kenley et al. |
| 5,349,658 A | 9/1994 | O'Rourke et al. |
| 5,369,570 A | 11/1994 | Parad |
| 5,659,614 A | 8/1997 | Bailey |
| 5,664,186 A | 9/1997 | Bennett et al. |
| 5,680,562 A | 10/1997 | Conrad et al. |
| 5,736,974 A | 4/1998 | Selker |
| 5,745,669 A | 4/1998 | Hugard et al. |

(Continued)

FOREIGN PATENT DOCUMENTS

| | | |
|---|---|---|
| EP | 629950 | 12/1997 |
| EP | 1152352 | 11/2001 |

(Continued)

OTHER PUBLICATIONS

SathiyaMoorthy ("Linux Crontab: 15 Awesome Cron Job Example" Jun. 11, 2009).*

(Continued)

*Primary Examiner* — Binh V Ho
(74) *Attorney, Agent, or Firm* — Fish & Richardson P.C.

(57) ABSTRACT

Methods, systems, and apparatus, including computer programs encoded on a computer storage medium, for file system management. In one aspect, a method includes receiving a request at a kernel to perform a file operation on a particular file; identifying a flag bit associated with the file; invoking user space file handler to perform particular action when the flag bit is set; determining whether notification that action has been performed by file handler is received; and allowing the file operation on the file when notification is received.

21 Claims, 4 Drawing Sheets

(56) References Cited

U.S. PATENT DOCUMENTS

| | | |
|---|---|---|
| 5,754,178 A | 5/1998 | Johnston et al. |
| 5,758,359 A | 5/1998 | Saxon |
| 5,790,120 A | 8/1998 | Lozares et al. |
| 5,802,175 A | 9/1998 | Kara |
| 5,818,936 A | 10/1998 | Mashayekhi |
| 5,819,032 A | 10/1998 | De Vries et al. |
| 5,819,292 A | 10/1998 | Hitz et al. |
| 5,831,617 A | 11/1998 | Bhukhanwala |
| 5,832,526 A | 11/1998 | Schuyler |
| 5,961,605 A | 10/1999 | Deng et al. |
| 5,987,566 A | 11/1999 | Vishlitzky et al. |
| 6,006,227 A | 12/1999 | Freeman et al. |
| 6,023,506 A | 2/2000 | Ote et al. |
| 6,097,313 A | 8/2000 | Takahashi et al. |
| 6,112,318 A | 8/2000 | Jouppi et al. |
| 6,134,660 A | 10/2000 | Boneh et al. |
| 6,167,532 A | 12/2000 | Wisecup |
| 6,188,405 B1 | 2/2001 | Czerwinski et al. |
| 6,269,381 B1 | 7/2001 | St. Pierre et al. |
| 6,366,988 B1 | 4/2002 | Skiba et al. |
| 6,396,500 B1 | 5/2002 | Qureshi et al. |
| 6,397,308 B1 | 5/2002 | Ofek et al. |
| 6,424,626 B1 | 7/2002 | Kidambi et al. |
| 6,460,055 B1 | 10/2002 | Midgley et al. |
| 6,553,392 B1 | 4/2003 | Mosher, Jr. et al. |
| 6,574,733 B1 | 6/2003 | Langford |
| 6,604,118 B2 | 8/2003 | Kleiman et al. |
| 6,625,704 B2 | 9/2003 | Winokur |
| 6,629,129 B1 | 9/2003 | Bookspan et al. |
| 6,636,937 B2 | 10/2003 | Peter |
| 6,638,313 B1 | 10/2003 | Freeman et al. |
| 6,701,454 B1 | 3/2004 | Fischer et al. |
| 6,711,572 B2 | 3/2004 | Zakharov et al. |
| 6,714,201 B1 | 3/2004 | Grinstein et al. |
| 6,714,952 B2 | 3/2004 | Dunham et al. |
| 6,725,427 B2 | 4/2004 | Freeman et al. |
| 6,728,735 B1 | 4/2004 | Fong |
| 6,768,999 B2 | 7/2004 | Prager et al. |
| 6,785,751 B1 | 8/2004 | Connor |
| 6,785,786 B1 | 8/2004 | Gold et al. |
| 6,801,229 B1 | 10/2004 | Tinkler |
| 6,836,657 B2 | 12/2004 | Ji et al. |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 | 7/2005 | Novik et al. |
| 6,947,556 B1 | 9/2005 | Matyas et al. |
| 6,948,039 B2 | 9/2005 | Biessener et al. |
| 6,959,368 B1 | 10/2005 | St. Pierre et al. |
| 6,993,710 B1 | 1/2006 | Coad et al. |
| 7,069,402 B2 | 6/2006 | Coulter et al. |
| 7,072,916 B1 | 7/2006 | Lewis et al. |
| 7,099,900 B1 | 8/2006 | Bromley et al. |
| 7,103,740 B1 | 9/2006 | Colgrove et al. |
| 7,107,527 B2 | 9/2006 | Takahashi et al. |
| 7,111,136 B2 | 9/2006 | Yamagami |
| 7,133,902 B2 | 11/2006 | Saha et al. |
| 7,134,026 B2 | 11/2006 | Horiuchi et al. |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,222,194 B2 | 5/2007 | Kano et al. |
| 7,257,717 B2 | 8/2007 | Huang |
| 7,275,075 B2 | 9/2007 | Cannon |
| 7,284,190 B2 | 10/2007 | Chellis et al. |
| 7,289,973 B2 | 10/2007 | Kiessig et al. |
| 7,318,134 B1 | 1/2008 | Oliveira et al. |
| 7,320,076 B2 | 1/2008 | Caronni |
| 7,386,801 B1 | 6/2008 | Horvitz et al. |
| 7,401,194 B2 | 7/2008 | Jewell |
| 7,418,619 B1 | 8/2008 | Uhlmann et al. |
| 7,434,164 B2 | 10/2008 | Salesin et al. |
| 7,434,177 B1 | 10/2008 | Ording et al. |
| 7,440,125 B2 | 10/2008 | Maekawa et al. |
| 7,483,693 B2 | 1/2009 | Lueng et al. |
| 7,505,762 B2 | 3/2009 | Onyon et al. |
| 7,518,611 B2 | 4/2009 | Boyd et al. |
| 7,558,930 B2 | 7/2009 | Kitamura et al. |
| 7,559,016 B1 | 7/2009 | Rakowski et al. |
| 7,574,459 B2 | 8/2009 | Sen et al. |
| 7,590,668 B2 | 9/2009 | Kathuria et al. |
| 7,596,586 B2 | 9/2009 | Gokhale et al. |
| 7,600,133 B2 | 10/2009 | Long et al. |
| 7,620,670 B2 | 11/2009 | Tokuda et al. |
| 7,624,133 B1 | 11/2009 | Ojalvo |
| 7,630,021 B2 | 12/2009 | Matsuzaka et al. |
| 7,657,450 B2 | 2/2010 | Amit et al. |
| 7,660,817 B2 | 2/2010 | Smith et al. |
| 7,669,141 B1 | 2/2010 | Pegg |
| 7,676,689 B1 | 3/2010 | Shioyama et al. |
| 7,711,771 B2 | 5/2010 | Kirnos |
| 7,734,594 B2 | 6/2010 | Wang |
| 7,739,464 B1 | 6/2010 | Coulter et al. |
| 7,739,622 B2 | 6/2010 | DeLine et al. |
| 7,809,687 B2 | 10/2010 | Cisler et al. |
| 7,809,688 B2 | 10/2010 | Cisler et al. |
| 7,836,311 B2 | 11/2010 | Kuriya et al. |
| 7,853,566 B2 | 12/2010 | Cisler et al. |
| 7,853,567 B2 | 12/2010 | Cisler et al. |
| 7,856,424 B2 | 12/2010 | Cisler et al. |
| 7,860,839 B2 | 12/2010 | Cisler et al. |
| 7,882,072 B1 | 2/2011 | Axe et al. |
| 7,890,527 B1 | 2/2011 | Nene et al. |
| 7,934,064 B1 | 4/2011 | Per et al. |
| 7,974,948 B2 | 7/2011 | Baer et al. |
| 8,010,900 B2 | 8/2011 | Hart et al. |
| 8,024,292 B2 | 9/2011 | Thompson et al. |
| 8,055,911 B2 | 11/2011 | Feng et al. |
| 8,099,392 B2 | 1/2012 | Paterson et al. |
| 8,166,415 B2 | 4/2012 | Cisler et al. |
| 8,209,308 B2 | 6/2012 | Rueben et al. |
| 8,219,995 B2 | 7/2012 | Flemming et al. |
| 8,229,897 B2 | 7/2012 | Cannon et al. |
| 8,245,078 B1 | 8/2012 | Chatterjee et al. |
| 8,260,770 B2 | 9/2012 | Bell et al. |
| 8,307,004 B2 | 11/2012 | Weiss et al. |
| 8,311,988 B2 | 11/2012 | Cisler et al. |
| 8,352,702 B2 | 1/2013 | O'Neill et al. |
| 8,370,853 B2 | 2/2013 | Giampaolo et al. |
| 8,468,136 B2 | 6/2013 | Ulrich et al. |
| 8,495,024 B2 | 7/2013 | Cisler et al. |
| 8,504,516 B2 | 8/2013 | Weiss et al. |
| 8,504,527 B2 | 8/2013 | Cisler et al. |
| 8,566,289 B2 | 10/2013 | Paterson et al. |
| 8,725,965 B2 | 5/2014 | Hart et al. |
| 8,745,523 B2 | 6/2014 | McInerney et al. |
| 8,775,378 B2 | 7/2014 | Cisler et al. |
| 2001/0047368 A1 | 11/2001 | Oshinsky et al. |
| 2001/0055317 A1 | 12/2001 | Kajizaki et al. |
| 2002/0016912 A1 | 2/2002 | Johnson |
| 2002/0023198 A1 | 2/2002 | Kokubun et al. |
| 2002/0046220 A1 | 4/2002 | Freeman et al. |
| 2002/0049883 A1 | 4/2002 | Schneider et al. |
| 2002/0054158 A1 | 5/2002 | Asami |
| 2002/0063737 A1 | 5/2002 | Feig et al. |
| 2002/0065999 A1 | 5/2002 | Kikuchi et al. |
| 2002/0080180 A1 | 6/2002 | Mander et al. |
| 2002/0107886 A1 | 8/2002 | Gentner et al. |
| 2002/0112237 A1 | 8/2002 | Kelts |
| 2002/0120648 A1 | 8/2002 | Ball et al. |
| 2002/0156921 A1 | 10/2002 | Dutta et al. |
| 2002/0160760 A1 | 10/2002 | Aoyama |
| 2002/0174283 A1 | 11/2002 | Lin |
| 2003/0014521 A1* | 1/2003 | Elson et al. .......... 709/225 |
| 2003/0016248 A1 | 1/2003 | Hayes |
| 2003/0018878 A1 | 1/2003 | Dorward et al. |
| 2003/0050940 A1 | 3/2003 | Robinson |
| 2003/0063128 A1 | 4/2003 | Salmimaa et al. |
| 2003/0065687 A1 | 4/2003 | Momiji et al. |
| 2003/0097640 A1 | 5/2003 | Abrams et al. |
| 2003/0122874 A1 | 7/2003 | Dieberger et al. |
| 2003/0126247 A1 | 7/2003 | Strasser et al. |
| 2003/0131007 A1 | 7/2003 | Schirmer et al. |

(56) References Cited

U.S. PATENT DOCUMENTS

| | | |
|---|---|---|
| 2003/0135650 A1 | 7/2003 | Kano et al. |
| 2003/0137540 A1 | 7/2003 | Klevenz et al. |
| 2003/0167380 A1 | 9/2003 | Green |
| 2003/0172937 A1 | 9/2003 | Faries et al. |
| 2003/0182332 A1 | 9/2003 | McBrearty et al. |
| 2003/0195903 A1 | 10/2003 | Manley et al. |
| 2003/0220949 A1 | 11/2003 | Witt et al. |
| 2004/0044707 A1 | 3/2004 | Richard |
| 2004/0066414 A1 | 4/2004 | Czerwinski et al. |
| 2004/0073560 A1 | 4/2004 | Edwards |
| 2004/0078641 A1 | 4/2004 | Fleischmann |
| 2004/0088331 A1 | 5/2004 | Therrien et al. |
| 2004/0117459 A1 | 6/2004 | Fry |
| 2004/0125137 A1 | 7/2004 | Stata et al. |
| 2004/0133575 A1 | 7/2004 | Farmer et al. |
| 2004/0139396 A1 | 7/2004 | Gelernter et al. |
| 2004/0143652 A1 | 7/2004 | Grannan et al. |
| 2004/0163009 A1 | 8/2004 | Goldstein et al. |
| 2004/0167942 A1 | 8/2004 | Oshinsky et al. |
| 2004/0175000 A1 | 9/2004 | Caronni |
| 2004/0193953 A1 | 9/2004 | Callahan et al. |
| 2004/0199779 A1 | 10/2004 | Huang |
| 2004/0199826 A1 | 10/2004 | Bertram et al. |
| 2004/0210608 A1 | 10/2004 | Lee et al. |
| 2004/0220965 A1 | 11/2004 | Harville et al. |
| 2004/0220980 A1 | 11/2004 | Forster |
| 2004/0228493 A1 | 11/2004 | Ma |
| 2004/0230892 A1 | 11/2004 | Horton |
| 2004/0235523 A1 | 11/2004 | Schrire et al. |
| 2004/0236769 A1 | 11/2004 | Smith et al. |
| 2004/0236916 A1 | 11/2004 | Berkowitz et al. |
| 2004/0236958 A1 | 11/2004 | Teicher et al. |
| 2004/0267700 A1 | 12/2004 | Dumais et al. |
| 2005/0010955 A1 | 1/2005 | Elia et al. |
| 2005/0071390 A1 | 3/2005 | Midgley et al. |
| 2005/0091596 A1 | 4/2005 | Anthony et al. |
| 2005/0102695 A1 | 5/2005 | Musser |
| 2005/0108253 A1 | 5/2005 | Metsatahti et al. |
| 2005/0138013 A1 | 6/2005 | Walker et al. |
| 2005/0138081 A1 | 6/2005 | Alshab et al. |
| 2005/0144135 A1 | 6/2005 | Juarez et al. |
| 2005/0149577 A1 | 7/2005 | Okada et al. |
| 2005/0165867 A1 | 7/2005 | Barton et al. |
| 2005/0187992 A1 | 8/2005 | Prahlad et al. |
| 2005/0204186 A1 | 9/2005 | Rothman et al. |
| 2005/0216520 A1 | 9/2005 | He et al. |
| 2005/0216527 A1 | 9/2005 | Erlingsson |
| 2005/0246398 A1 | 11/2005 | Barzilai et al. |
| 2005/0262168 A1 | 11/2005 | Helliker et al. |
| 2005/0262377 A1 | 11/2005 | Sim-Tang |
| 2006/0026218 A1 | 2/2006 | Urmston |
| 2006/0041603 A1 | 2/2006 | Paterson et al. |
| 2006/0041823 A1 | 2/2006 | Wolfgang et al. |
| 2006/0053332 A1 | 3/2006 | Uhlmann |
| 2006/0064444 A1 | 3/2006 | Van Ingen et al. |
| 2006/0064634 A1 | 3/2006 | Dettinger et al. |
| 2006/0080521 A1 | 4/2006 | Barr et al. |
| 2006/0085792 A1 | 4/2006 | Traut |
| 2006/0085817 A1 | 4/2006 | Kim et al. |
| 2006/0088167 A1 | 4/2006 | Bade et al. |
| 2006/0101384 A1 | 5/2006 | Sim-Tang et al. |
| 2006/0106893 A1 | 5/2006 | Daniels et al. |
| 2006/0117309 A1 | 6/2006 | Singhal et al. |
| 2006/0129496 A1* | 6/2006 | Chow et al. .................. 705/59 |
| 2006/0137010 A1 | 6/2006 | Kramer et al. |
| 2006/0143250 A1 | 6/2006 | Peterson et al. |
| 2006/0150107 A1 | 7/2006 | Leung et al. |
| 2006/0156246 A1 | 7/2006 | Williams et al. |
| 2006/0161861 A1 | 7/2006 | Holecek et al. |
| 2006/0173848 A1 | 8/2006 | Peterson et al. |
| 2006/0200754 A1* | 9/2006 | Kablesh et al. .............. 715/505 |
| 2006/0218363 A1 | 9/2006 | Palapudi |
| 2006/0224956 A1 | 10/2006 | Storisteanu et al. |
| 2006/0235907 A1 | 10/2006 | Kathuria et al. |
| 2006/0236406 A1 | 10/2006 | Johnson |
| 2006/0248294 A1 | 11/2006 | Nedved et al. |
| 2006/0253470 A1 | 11/2006 | Friedman et al. |
| 2006/0288205 A1 | 12/2006 | Linares |
| 2007/0027935 A1 | 2/2007 | Haselton et al. |
| 2007/0030528 A1 | 2/2007 | Quaeler et al. |
| 2007/0038884 A1 | 2/2007 | Campbell et al. |
| 2007/0043715 A1 | 2/2007 | Kaushik et al. |
| 2007/0043790 A1 | 2/2007 | Kryger |
| 2007/0070066 A1 | 3/2007 | Bakhash |
| 2007/0078910 A1 | 4/2007 | Bopardikar |
| 2007/0088702 A1 | 4/2007 | Fridella et al. |
| 2007/0094312 A1 | 4/2007 | Sim-Tang |
| 2007/0106978 A1 | 5/2007 | Felts |
| 2007/0136381 A1 | 6/2007 | Cannon et al. |
| 2007/0136389 A1 | 6/2007 | Bergant et al. |
| 2007/0136423 A1* | 6/2007 | Gilmore et al. .............. 709/204 |
| 2007/0143425 A1 | 6/2007 | Kieselbach et al. |
| 2007/0150326 A1* | 6/2007 | Nakao et al. ................... 705/8 |
| 2007/0156772 A1 | 7/2007 | Lechner |
| 2007/0168497 A1 | 7/2007 | Locker et al. |
| 2007/0174580 A1 | 7/2007 | Shulga |
| 2007/0180268 A1 | 8/2007 | Filimon et al. |
| 2007/0185879 A1 | 8/2007 | Roublev et al. |
| 2007/0185922 A1 | 8/2007 | Kapoor et al. |
| 2007/0186127 A1 | 8/2007 | Desai et al. |
| 2007/0192386 A1 | 8/2007 | Fries et al. |
| 2007/0266007 A1 | 11/2007 | Arrouye et al. |
| 2007/0271263 A1 | 11/2007 | Merrill |
| 2007/0271303 A1 | 11/2007 | Menendez et al. |
| 2007/0282854 A1 | 12/2007 | Bhogal et al. |
| 2007/0288536 A1 | 12/2007 | Sen et al. |
| 2008/0016576 A1 | 1/2008 | Ueda et al. |
| 2008/0022393 A1 | 1/2008 | Waltermann et al. |
| 2008/0028007 A1 | 1/2008 | Ishii et al. |
| 2008/0033969 A1 | 2/2008 | Koo et al. |
| 2008/0034004 A1 | 2/2008 | Cisler et al. |
| 2008/0034011 A1 | 2/2008 | Cisler et al. |
| 2008/0034017 A1 | 2/2008 | Giampaolo et al. |
| 2008/0034019 A1 | 2/2008 | Cisler et al. |
| 2008/0046557 A1 | 2/2008 | Cheng |
| 2008/0065663 A1 | 3/2008 | Farlee et al. |
| 2008/0070496 A1 | 3/2008 | Jackson |
| 2008/0077808 A1 | 3/2008 | Teicher et al. |
| 2008/0082578 A1 | 4/2008 | Hogue et al. |
| 2008/0091655 A1 | 4/2008 | Gokhale et al. |
| 2008/0126442 A1 | 5/2008 | Cisler et al. |
| 2008/0141029 A1 | 6/2008 | Culver |
| 2008/0162999 A1 | 7/2008 | Schlueter et al. |
| 2008/0168184 A1 | 7/2008 | Freedman et al. |
| 2008/0168245 A1 | 7/2008 | De Atley et al. |
| 2008/0168391 A1 | 7/2008 | Robbin et al. |
| 2008/0172428 A1 | 7/2008 | Stokes |
| 2008/0172607 A1 | 7/2008 | Baer |
| 2008/0177961 A1 | 7/2008 | McSharry et al. |
| 2008/0208630 A1 | 8/2008 | Fors et al. |
| 2008/0214163 A1 | 9/2008 | Onyon et al. |
| 2008/0216011 A1 | 9/2008 | Gould |
| 2008/0222512 A1 | 9/2008 | Albornoz et al. |
| 2008/0229037 A1 | 9/2008 | Bunte et al. |
| 2008/0250342 A1 | 10/2008 | Clark et al. |
| 2008/0250400 A1* | 10/2008 | Vertes ........................... 717/158 |
| 2008/0285754 A1 | 11/2008 | Kezmann |
| 2008/0307017 A1 | 12/2008 | Lyons et al. |
| 2008/0307020 A1 | 12/2008 | Ko et al. |
| 2008/0307347 A1 | 12/2008 | Cisler et al. |
| 2008/0310628 A1 | 12/2008 | Fujioka et al. |
| 2008/0310633 A1 | 12/2008 | Brown et al. |
| 2008/0313243 A1 | 12/2008 | Poston et al. |
| 2009/0019291 A1 | 1/2009 | Murray |
| 2009/0031401 A1 | 1/2009 | Cudich et al. |
| 2009/0052669 A1 | 2/2009 | Ma |
| 2009/0116641 A1* | 5/2009 | Bokor et al. .................. 380/44 |
| 2009/0307333 A1 | 12/2009 | Welingkar et al. |
| 2010/0017855 A1 | 1/2010 | Johnson et al. |
| 2010/0063960 A1 | 3/2010 | Lehto |
| 2010/0070844 A1 | 3/2010 | Aymeloglu et al. |
| 2010/0169823 A1 | 7/2010 | Audet |
| 2010/0205397 A1 | 8/2010 | Chellam |
| 2010/0217929 A1 | 8/2010 | Kirshenbaum et al. |

(56) References Cited

U.S. PATENT DOCUMENTS

| | | | |
|---|---|---|---|
| 2011/0016087 A1 | 1/2011 | Freedman et al. | |
| 2011/0016089 A1 | 1/2011 | Freedman et al. | |
| 2011/0083098 A1 | 4/2011 | Cisler et al. | |
| 2011/0202763 A1 | 8/2011 | Martin et al. | |
| 2011/0296351 A1 | 12/2011 | Ewing et al. | |
| 2011/0302502 A1 | 12/2011 | Hart et al. | |
| 2012/0185438 A1 | 7/2012 | Giampaolo et al. | |
| 2012/0185762 A1 | 7/2012 | Ozer et al. | |
| 2012/0185767 A1 | 7/2012 | Schlegel | |
| 2012/0198383 A1 | 8/2012 | Cisler et al. | |
| 2012/0246565 A1 | 9/2012 | Kumamoto | |
| 2012/0272173 A1 | 10/2012 | Grossman et al. | |
| 2013/0066836 A1 | 3/2013 | Weiss et al. | |
| 2013/0073821 A1* | 3/2013 | Flynn et al. | 711/162 |
| 2013/0212599 A1 | 8/2013 | Giampaolo et al. | |

FOREIGN PATENT DOCUMENTS

| | | |
|---|---|---|
| EP | 1582982 | 10/2005 |
| WO | WO 01/06356 | 1/2001 |
| WO | WO 02/101540 | 12/2002 |
| WO | WO 2005/045756 | 5/2005 |
| WO | WO 2008/019237 | 2/2008 |
| WO | WO 2008/019259 | 2/2008 |

OTHER PUBLICATIONS

SathiyaMoorthy ("Linix Crontab: 15 Awesome Cron Job Example", Jun. 11, 2009).*
Shi et al., "USP: A Lightweight File System Management Framework," 2010 Fifth IEEE International Conference on Networking, Architecture, and Storage, 2010 IEEE, pp. 250-256.
Anonymous, "ForeverSave Version 1.1.3", Published Jan. 1, 2009, 16 pgs [online]. Retrieved from the Internet: <URL: http://tool-forcesw.com/docs/ForeverSave_Manual.pdf>.
"Apple Previews Mac OS X Leopard," Aug. 7, 2006, [Online] [Retrieved on Nov. 26, 2007] Retrieved from the Internet: URL:http://www.apple.com/pr/library/2006/aug/07leopard.html, pp. 1-2.
"Aulaclic: Unit 6. The Recycle Bin," Nov. 2005, [Online] [Retrieved on Nov. 26, 2007] Retrieved from the Internet: URL:http://www.teacherclick.com/winxp/t_6_1.htm, pp. 1-2.
"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.
"MSDN Academic Alliance Developer Center, Curriculum Repository Glossary," [Online] [Retrieved on Apr. 22, 2009] Retrieved from the Internet URL: http://www.academicresourcecenter.net/curriculum/glossary.aspx, 4 pages.
"StorageSync: Backup, Restore, & Synchronization Software User's Guide", SimpleTech, 2003, 100 pages.
"What's New in Word 2002," Wellesly College Information Services Computing Documentation, Jan. 2002, [Online] Retrieved on Aug. 14, 2008] Retrieved from the Internet URL: http://www.wellesley.edu/Computing/Office02/Word02/word02.html, 19 pages.
Bonwick, "ZFS The Last Word in File Systems," [Online] [Retrieved on Jan. 22, 2008] Retrieved from the Internet: URL:http://opensolaris.org/os/community/zfs/docs/zfs.pdf, 34 pages.
Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.
Charles Rubin, Mary Millhollon and Katherine Murray, "Microsoft Office Word 2003, Official Manual", First Edition, Japan, Nikkei BP Softpress, Jul. 12, 2004, vol. 1, p. 300, 815-818.
Chen et al., "Data Redundancy and Compression Methods for a Disk-based Network Backup System", 2004, IEEE, pp. 1-8.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.
European Examiner Ulf Johansson Extended European Search Report and Written Opinion, European Application No. 11171738.5, Aug. 29, 2011, 5 pages.
European Examiner Werner Ebert, Communication pursuant to Article 94(3) EPC for Application No. EP 07 799 899.5, dated May 14, 2009, 2 pages.
European Examiner Werner Ebert, Communication pursuant to Article 94(3) Epc for Application No. EP 07 799 899.5, dated Oct. 7, 2009, 4 pages.
European Search Report dtd Oct. 16, 2012 in EP Application No. 12150673, 9 pgs.
Examination Report from European Application No. 07 813 540.7 dated Oct. 27, 2011, 5 pages.
Examination Report from European Application No. 07 813 593.6 dated Mar. 25, 2013, 4 pages.
Examination Report from European Application No. 07 813 605.8 dated Oct. 27, 2011, 5 pages.
Extended European Search Report, European Application No. 11184579.8, Nov. 17, 2011, 6 pages.
Godfrey, Michael et al., "Using Original Analysis to Detect Merging and Splitting of Source Code Entities," IEEE Transactions on Software Engineering, vol. 31, No. 2. Feb. 2005. pp. 166-181.
Griffiths, "Leopard first looks: Time Machine," Aug. 8, 2006 [Online] [Retrieved on Nov. 23, 2007] Retrieved from the Internet: URL:http://www.macworld.com/2006/08/firstlooks/leotimemac/index.php?pf=1, pp. 1-2.
Harder, "Microsoft Windows XP System Restore," [Online] [Retrieved on Jul. 7, 2009] Retrieved from the Internet URL: http://msdn.microsoft.com/en-us/library/ms997627.aspx, 8 pages.
In-link files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/in.html, 5 pages.
International Search Report and Written Opinion, PCT/US2007/074653, Aug. 14, 2008, 14 pages.
International Search Report and Written Opinion, PCT/US2007/074729, Jul. 12, 2007, 11 pages.
International Search Report and Written Opinion, PCT/US2007/074863 Apr. 21, 2009, 20 pages.
Microsoft Corporation, "Description of the AutoRecover Functions in Excel," [online] Microsoft Corporation, Aug. 10, 2007, Article ID 289273; URL: http://support.microsoft.com/kb/289273/en-us.
Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.
Microsoft-TechNet, "Using Encrypting File System," Nov. 3, 2005, Microsoft, 40 pages.
Office Action dated Feb. 29, 2012 from related Chinese Application No. 200880024710.0, 11 pages.
Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.
Rubel, "Easy Automated Snapshot-Style Backups with Rsync," [Online] [Retrieved on Nov. 8, 2010] Retrieved from the Internet URL: http://www.mikerubel.org/computers/rsync_snapshots; 18 pages.
Sun Microsystems, Inc., "ZFS On-Disk Specification," Draft: Dec. 9, 2005, [Online] [Retrieved on Jan. 22, 2008]; Retrieved from the Internet URL: http://opensolaris.org/os/community/zfs/docs/ondiskformat0822.pdf, 55 pages.
Tittel, "An EAZ Way to Restore Crippled and Inoperable Systems," ChannelWeb, Apr. 25, 2005, [Online] [Retrieved on Aug. 13, 2008] Retrieved from the Internet URL: http://www.crn.com/white-box/161502165, 10 pages.

(56) References Cited

OTHER PUBLICATIONS

Wang et al., "A Secure and Efficient Desktop Backup and Recovery System", 2007, IEEE, pp. 304-309.
Bonwick et al., "The Zettabyte File System," [Online] [Retrieved on Jan. 22, 2008] Retrieved from the Internet: URL:http://partneradvantage.sun.com/protected/solaris10/adoptionkit/tech/zfs/zfs_overview.pdf, 13 pages.
Communication pursuant to Article 94(3) EPC for Application No. EP 07 813 540.7, dated Jun. 23, 2009, 2 pages.
International Search Report and Written Opinion, PCT/US2007/074881, Jul. 12, 2007, 7 pages.
International Search Report and Written Opinion, PCT/US2008/065146, Oct. 31, 2008, 15 pages.
International Search Report and Written Opinion, PCT/US2008/066212, Mar. 9, 2009, 20 pages.

* cited by examiner

FILE SYSTEM MANAGEMENT

CROSS-REFERENCE TO RELATED APPLICATIONS

This application claims the benefit under 35 U.S.C. §119 (e) of the filing date of U.S. Patent Application No. 61/433,180, for File System Management, which was filed on Jan. 14, 2011, and which is incorporated here by reference.

BACKGROUND

This specification relates to file systems.

Requests for particular file operations, for example to read a file, are sent to the operating system kernel (e.g., using a system call). The kernel manages resources (e.g., system hardware as well as particular information such as a database record) available to perform the operations. The kernel allocates resources for performing the requested operation. Conventionally, resources can only be used by a single process at a time. When two processes are running, they can each be waiting for an event of the other to occur in order to proceed. For example, the event that each process is waiting for can be the release of a respective recourse currently possessed by the other process. However, since both processes are waiting for the other, neither will cause the event. This results in a deadlock.

SUMMARY

This specification describes technologies relating to file system management.

In general, one innovative aspect of the subject matter described in this specification can be embodied in methods that include the actions of receiving a request at a kernel to perform a file operation on a particular file; identifying a flag bit associated with the file; invoking user space file handler to perform particular action when the flag bit is set; determining whether notification that action has been performed by file handler is received; and allowing the file operation on the file when notification is received. Other embodiments of this aspect include corresponding systems, apparatus, and computer programs recorded on computer storage devices, each configured to perform the operations of the methods.

These and other embodiments can each optionally include one or more of the following features. Invoking the user space file handler includes holding the operation and setting a time for the file handler to perform the action without setting any resource locks. Expiration of the set time without a request for further time results in the kernel performing the file operation. The file operation is a read file operation and the file hander requests the file data from a network location. The file operation is a modify file operation and the file handler copies the file prior to performing the modify file operation being performed. The method further includes identifying i-node information for the file, where the i-node information includes one or more flag bits. The method further includes when the flag bit is set, accessing extended attribute information associated with the file to identify special file handling operation to be performed by file handler.

Particular embodiments of the subject matter described in this specification can be implemented so as to realize one or more of the following advantages. Techniques are provided for invoking user space handlers for kernel space events. As a result, file operations are also intercepted before they are performed. A hold on a request can be initiated while a user space handler is invoked without setting any locks. Thus, deadlocks can be avoided. Invoking user space handlers provides greater flexibility in performing operations than in the kernel space, for example, initiating network connections to retrieve data. Special file handling can be identified for files by examining i-node flags. Using an i-node flag to identify special file handling provides a quick check and reduces input/output (I/O) operations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When a file operation request is received at the kernel, for example, as a system call to read a file or to modify a file (write), a determination is made as to whether additional operations are to be performed before allowing the requested file operation. If additional operations are to be performed, the kernel institutes a hold on the file operation, without reserving any resources to the request (e.g., no locks), and sets a timeout timer. An extended attribute of the file identifies special file handling to be performed on the file. A corresponding user space file handler is requested to perform one or more actions within the time provided by the timer. When the timer expires, the hold is released and the requested resources are allocated for performing the requested file operation.

Figure 1:
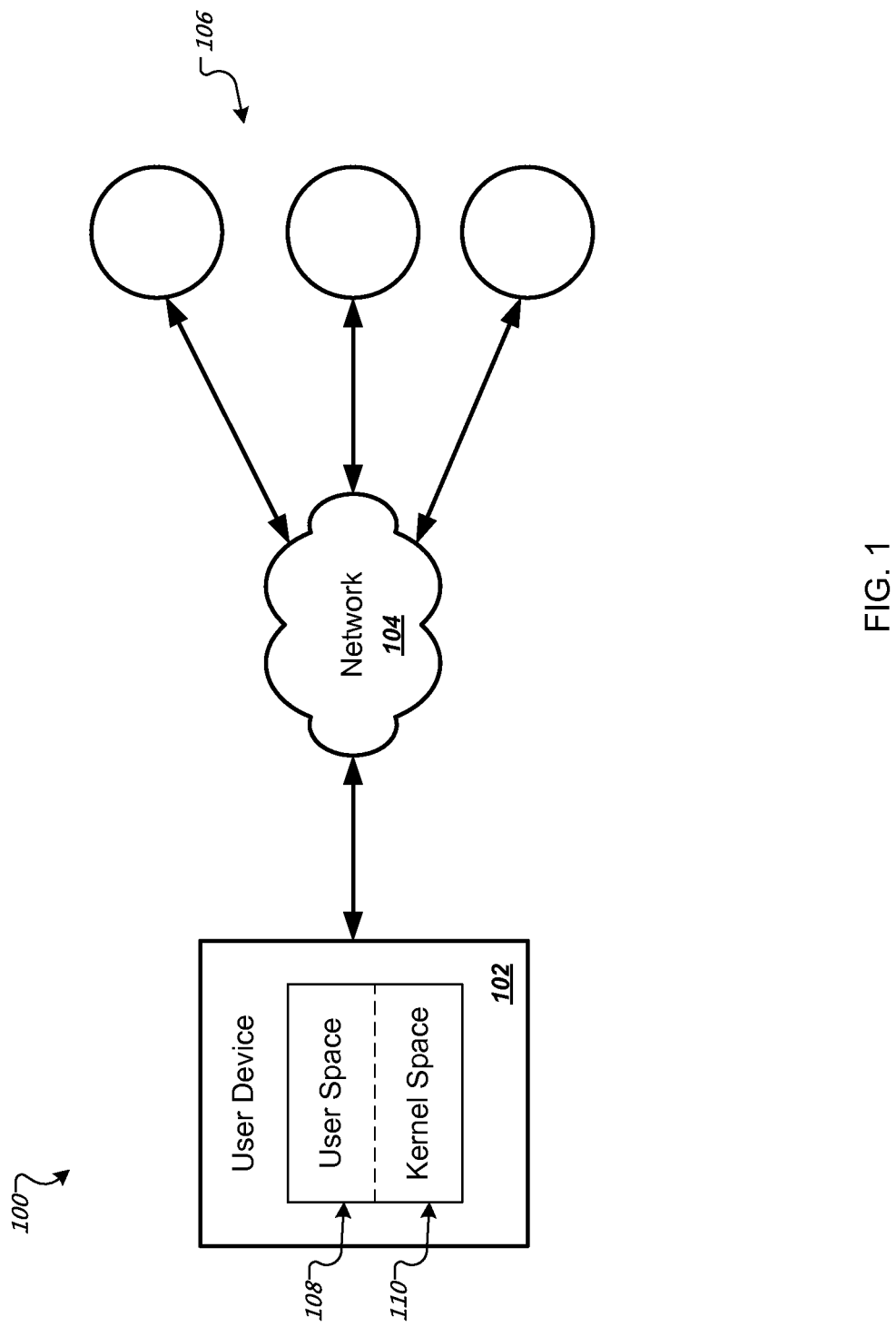
FIG. 1 is a block diagram of an example system.

FIG. 1 is a block diagram of an example system 100. The system 100 includes a user device 102 that can communicate with one or more network locations 106 through a network 104.

The user device 102 can represent various forms of digital computing devices, for example, laptops, desktops, workstations, personal digital assistants, tablet computers, and other mobile devices (e.g., smartphones, mobile phones). The network 104 can be, for example, a local area network (LAN), wide area network (WAN), the Internet, or a combination thereof. Communication through the network 104 can be performed using one or more wired, wireless, or a combination of connections. The network locations 106 can be other computing devices, remote storage locations, servers, or other data repositories accessible by the user device 102.

The user device 102 includes both a kernel space 110 and user space 108. In particular, an operating system typically segregates virtual memory into the kernel space 110 and the user space 108. The kernel space 110 is reserved for running the kernel, kernel extensions, and device drivers. The user space 108 includes the memory area where user mode applications work. The kernel represents a bridge between applications and the actual data processing done at the hardware level. The kernel's responsibilities include managing the system's resources. Particular operations can be performed in the user space that cannot be performed in the kernel space and vice versa. For example, network connections can be made in user space but not in kernel space.

In response to a request, for example, to perform a file modification or a file open, the kernel can invoke one or more file handlers in the user space 108 to perform particular actions prior to assigning resources in response to the request. The user space handler can perform operations including opening network connections in order to request data from one or more network locations 106 through the network 104.

Figure 2:
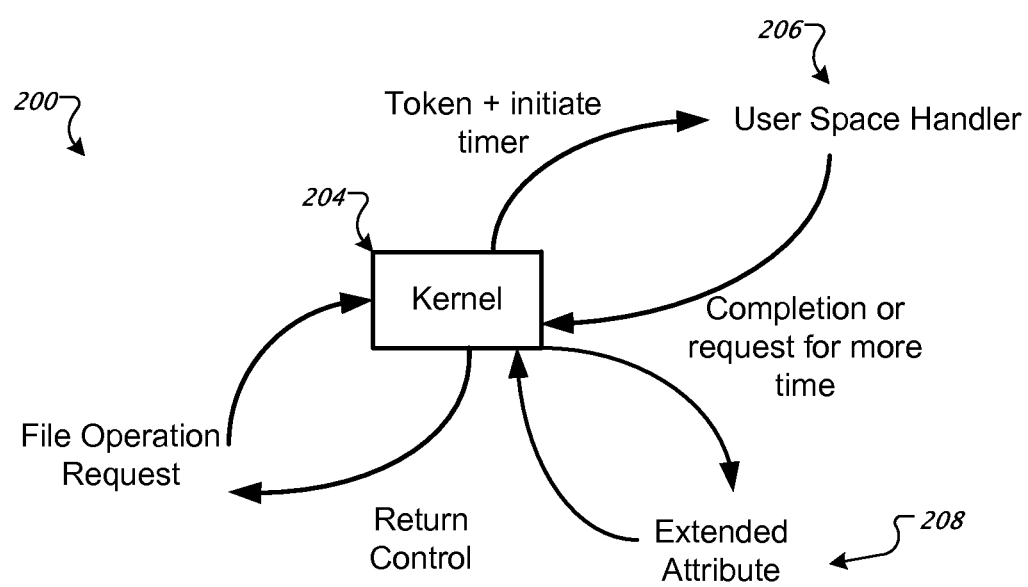
FIG. 2 is an example diagram of kernel space interactions.

FIG. 2 is an example diagram of kernel space interactions 200. A file operation request is received by the kernel 204 (e.g., from a user space application). Based on an analysis of the request, the kernel holds the request and invokes a user space handler 206 to perform one or more actions (e.g., according to a token sent to the user space file handler 206). In particular, the kernel can read an extended attribute 208 associated with the file to identify the particular file operations to be performed, e.g., prior to allowing the requested file operation to proceed. The kernel does not place a lock on any resources. The kernel further can set a timer in which the user space handler 206 has to perform the one or more actions or request additional time to perform the one or more actions.

The user space hander 206 performs the one or more actions and sends the token back to the kernel 204 indicating that the actions have been completed. Alternatively, the user space handler 206 can send a request for more time. The kernel 204 can increase or reset the timer in response to the request for more time. Once notified of the completed action, the kernel 204 releases the hold and assigns resources for performing the requests file operation.

No locks are placed by the kernel 204. Therefore, if the timer runs out without receiving notification or a request for time from the user space handler 206, the hold is released by the kernel 204 and resources are allocated for attempting to perform the requested file operation, after which control returns to the application (e.g., to perform further operations based on the requested file operation, for example, presenting file contents based on a requested read operation).

Figure 3:
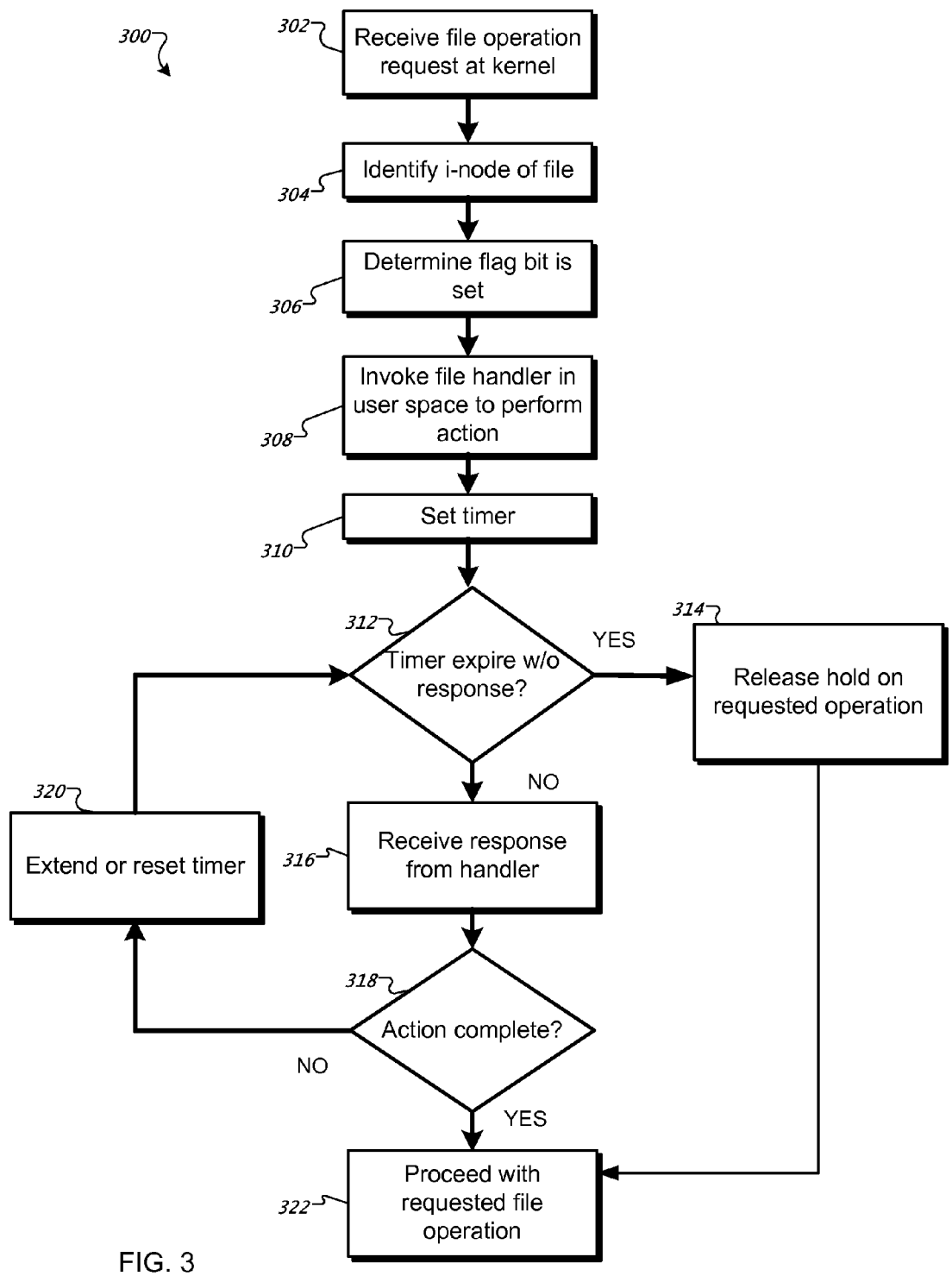
FIG. 3 is a flow diagram of an example process for performing file operations.

FIG. 3 is a flow diagram of an example process 300 for performing file operations. A request to perform a file operation is received (302). The request can be a system call to perform various types of file operations. For example, a read operation (e.g., to read a file) or a write operation (e.g., to edit file data). The received request can be sent to the kernel in response to user actions, for example, a user selecting a file to open or a user performing an edit on an open file.

File information associated with the request is identified (304). For example, in order to perform a read or write of a file, the file data is identified according to the file's i-node or other catalog record. This is a unique identifier for the file that is indexed (e.g., a table of i-nodes) to file information including the location of blocks of data in which the file is stored, time stamps, last accessed, owner of file, permissions, size, and/or creation time. The kernel can load the i-node file information into memory. The i-node can also be associated with one or more flag bits.

A determination is made as to whether a particular flag bit is set (306). This particular flag bit indicates that special file handling should be performed. However, as a single bit this does not indicate what processing is to be performed on the file. Instead, when the flag bit is set, the kernel reads the extended attribute associated with the file. The extended attribute is an additional data structure associated with the file that describes the special file handling to be performed. Since the i-node (or corresponding catalog record) is loaded into memory by the kernel, little processing cost is required to check the flag bits (e.g., no additional I/O operations are required). If the flag bit is not set, the kernel can proceed to respond to the request.

For example, the extended attribute can provide metadata about the type of file and what special handling is needed to be performed. For example, the extended attribute can indicate that the particular file is a data-less file (e.g., the file is only virtually present) and that the corresponding file data needs to be retrieved before the requested operation can be performed (e.g., the file data has to be retrieved before the file can be read). In another example, the extended attribute can indicate that the particular file is to be backed up before the requested operation is performed (e.g., to back-up a copy of the file prior to modifying the file). In some implementations, the extended attribute identifies a particular user space handler to be invoked (e.g., designed to perform particular operations).

A user space file handler is invoked to perform the one or more actions indicated by the extended attribute (308). For example, in some implementations, the file hander has already called into the kernel requesting work and is waiting to be assigned a token. Alternatively, the specific user space file handler is invoked by the kernel. The kernel sends the token to the file handler indicating the actions to be performed with respect to the file. The file hander then initiates a thread to perform the requested action. For example, the file handler can open one or more network connections to a destination in which the file data is stored. The file data can then be retrieved and associated with the existing zero data file.

In addition to invoking the user space file handler, the kernel holds the requested operation and sets a timer (310). The timer provides a time limit for the user space file handler to perform the indicated operation. While the timer holds the requested operation, no resources are locked out by the kernel. Thus, no deadlocks can occur from the request (e.g., from a resource request made by the user space file hander). As a result, other requests for resources can be made (e.g., as part of other processes) while the user space file handler is performing the one or more actions.

A determination is made as to whether the timer has expired before receiving a response from the user space file handler (312). If a response is not received, the hold is released (314) and the requested operation proceeds (322). For example, the kernel can allocate the necessary resources for performing the requested operation. The operation may or may not be able to be performed. For example, if the requested file operation is to read a file that is not present, then an error will result from the attempted read operation. However, if the requested file operation is a file modification to an open file, the modification can be performed.

If a response is received from the user space file handler (316) before the timer has expired, a determination is made as to whether or not the action or actions have been completed (318). If the action or actions have not been completed, a request for more time can be sent by the user space file handler. The timer is extended or reset (320). The process then returns to the determination of whether a response is received before the timer expires (312). The hold on the file operation is maintained until the timer again expires.

If the action has been completed, the hold is released and the requested file operation proceeds (322). The user space file handler can indicate that the action has been complete, for example, by returning the received token to the kernel or other notification. The file operation can proceed, for example, by the kernel assigning resources to perform the requested operation. For example, when the request is a read file request, the resources are allocated for reading the file into memory. The file data can then, for example, be presented to the user (e.g., as a document).

Specific examples are provided below to further illustrate the process 300.

In some implementations, data-less data items are created that present the appearance of data items that are not located on the particular user device. For example, items being synchronized or downloaded from other locations (e.g., other user devices or network locations) may not have the data to be synchronized or downloaded stored locally. Different criteria can be used to determine whether or not to download the data. For example, the size of the file, the current transfer rate, the type of data, etc. As such, the data can be stored elsewhere and retrieved when requested by the user. In order to present the appearance of the data, virtual data items can be generated. For example, files can appear to be present on the user device (e.g., as a displayed icon in a particular directory), but the file data is not physically present.

Similarly, in another implementation, data items can be removed from the user device and stored in a network location while retaining the virtual item representation. Again, different criteria can be used to determine whether or not to remove a data item from physically being located on the user device. For example, data items that are accessed infrequently can be removed to save space. Additionally, data items can be removed based on a percentage or amount of free space remaining on the device to store data (e.g., when a threshold storage level is reached).

These virtual data items can appear as any other file, directory, or other data on the file system or can be identified as virtual files (e.g., with a particular badging of an associated icon).

When a user requests one of these virtual data items, for example a file, the data must be retrieved before the file read is attempted otherwise an error will result. Consequently, the read request the flag bit indicates that the file is an empty file and that the file data must be retrieved. The read request is held by the kernel while a particular user space file handler is requested in order to retrieve the associated file data.

The user space file handler performs the network connections to the storage location of the file data (e.g., at a location indicated in the extended attribute data). The retrieved file data is then associated with the data-less data file such that the file now has the file contents (e.g., the data-less file can be modified or replaced). If the user space file handler fails to perform the actions, for example, because the network connections are unavailable, a time out will result in the hold being released by the kernel. However, since there is no data to be read, an error will result. This read error can be presented to the user indicating that the action is unable to be performed at the present time.

Once the file data is retrieved, the user space file handler indicates to the kernel that the actions have been performed and the kernel releases the hold on the read operation. The file is then read, for example, for presentation to the user by an application associated with the file.

In some other implementations, changes to data items are tracked and periodically stored prior to any changes being made. For example, a modification to a data item can trigger a copy of the data item (e.g., a version of the data item) being stored prior to performing the modification. The user device can maintain a collection of versions of the data item for later retrieval by the user.

Thus, in order to store copies of the file prior to modification, the file modification request has to be intercepted and the copy performed prior to allowing the modification operation to proceed.

When a request to perform a file modification operation is received by the kernel, the kernel identifies the flag bit as set. The extended attribute indicates that the file is one to be tracked and that a copy should be made before a file modification operation. In some implementations, this is variable depending on specific criteria. For example, only one copy can be made for a given time period (e.g., 1 hour). Thus, a copy is made of the file prior to the first modification of the file.

However, any subsequent modifications to the same file within that time period are allowed to proceed without copying the file. Thus, a file that changes 10 times within an hour will only be copied the first time after the start of the specified time period. Later requests to modify the file within the specified time period will not trigger the special file handling prior to performing the requested operation.

In some other implementations, when a request to perform a file modification operation is received, a determination is made as to whether a prior operation has been performed on the file within a specified time period. For example, the time of the requested modification can be compared to operations performed on the file within a current fixed window of time. For example, the specified time period can be one of a sequence of fixed time windows (e.g., every hour block of time can form a specified time period regardless of when a prior file modification operation occurred). If there has not been a prior operation on the file within a current time window (or less than a specified number of modifications), the file is copied prior to the modification operation being performed. In some implementations, in addition to the determination with respect to time, the type of requested modification is considered. For example, an edit operation can trigger the copy being made while a name change may not.

If there has been a prior operation on the file within the current time window, the requested modification can be allowed within performing any intervening action (e.g., copying the unmodified version of the file). For example, when only one action (e.g., copy file) per time window is performed prior to a requested modification operation on a file.

If the file is to be copied prior to the modification operation, the user space file handler is called to perform the file copy operation. When the kernel is notified that the operation is complete, the hold on the operation is removed and the file is allowed to be modified.

If a timeout occurs without a response from the user space file handler, the hold is released and the modification is allowed to occur. Thus, no pre-modified version will be stored.

In some other implementations, files can have a flag bit set when the file is to be tracked. For example, when versions of a file are stored as described above, the versions can be tracked to make sure all the versions are linked together. In another example, if a request for a name change is received for a tracked file the name change is held while performing a link between the new file and the earlier versions.

Figure 4:
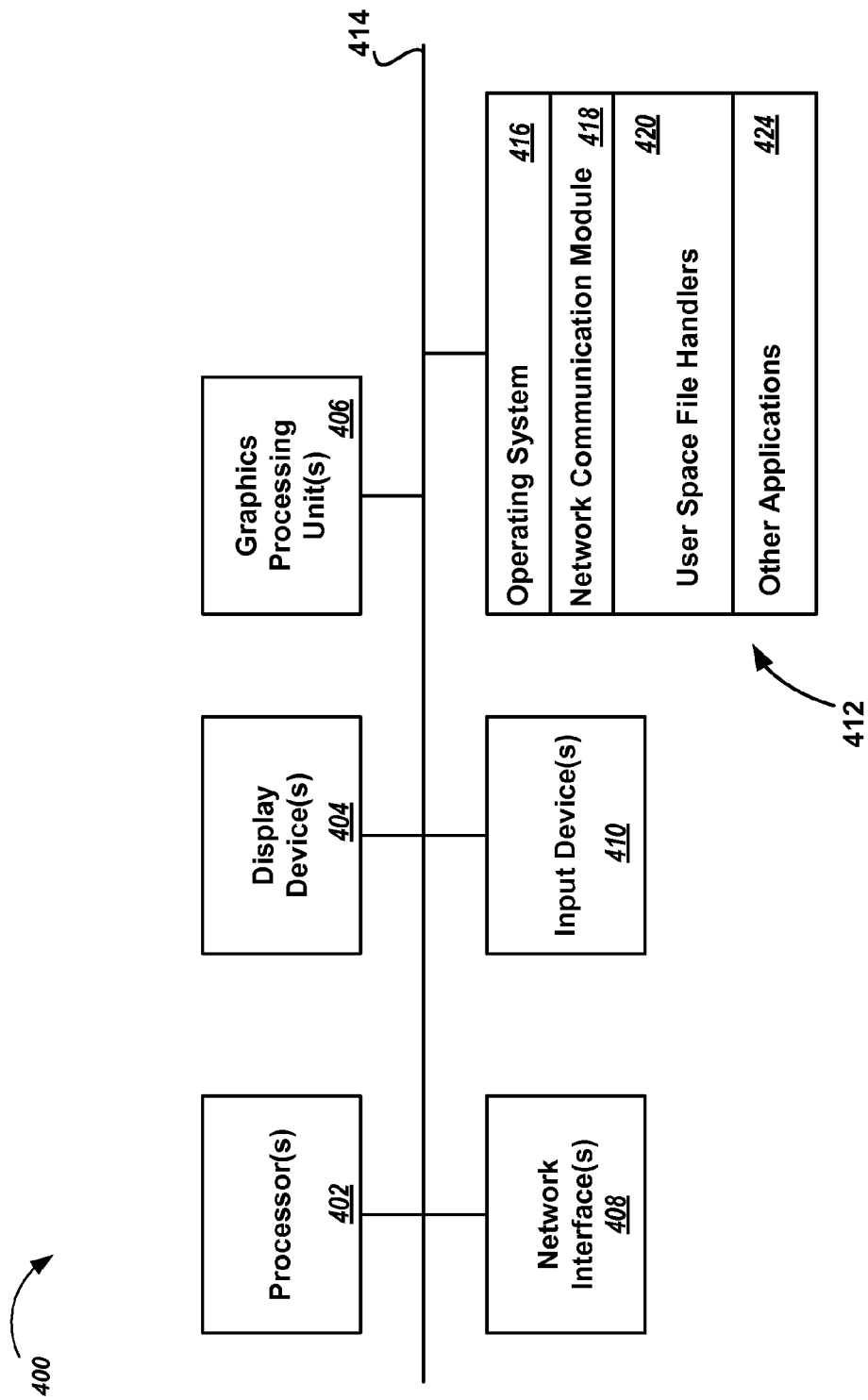
FIG. 4 is an example system architecture.

FIG. 4 illustrates an example architecture of a system 400. The system architecture 400 is capable of performing operations for performing file system management. The architecture 400 includes one or more processors 402 (e.g., IBM PowerPC, Intel Pentium 4, etc.), one or more display devices 404 (e.g., CRT, LCD), graphics processing units 406 (e.g., NVIDIA GeForce, etc.), a network interface 408 (e.g., Ethernet, FireWire, USB, etc.), input devices 410 (e.g., keyboard, mouse, etc.), and one or more computer-readable mediums 412. These components exchange communications and data using one or more buses 414 (e.g., EISA, PCI, PCI Express, etc.).

The term "computer-readable medium" refers to any medium that participates in providing instructions to a processor 402 for execution. The computer-readable medium 412 further includes an operating system 416 (e.g., Mac OS®, Windows®, Linux, etc.), a network communication module 418, user space file handlers 422, and other applications 424.

The operating system 416 can be multi-user, multiprocessing, multitasking, multithreading, real-time and the like. The operating system 416 performs basic tasks, including but not limited to: recognizing input from input devices 410; sending output to display devices 404; keeping track of files and directories on computer-readable mediums 412 (e.g., memory or a storage device); controlling peripheral devices (e.g., disk drives, printers, etc.); and managing traffic on the one or more buses 414. The operating system 416 also includes kernel functions. The network communications module 418 includes various components for establishing and maintaining network connections (e.g., software for implementing communication protocols, such as TCP/IP, HTTP, Ethernet, etc.).

The operating system 416, particularly the kernel, and the user space file handlers 422 provide various software components for performing the various functions for holding file operation requests at the kernel and invoking a user space handler to perform one or more actions before releasing or timing out the hold on the requested operation as described with respect to FIGS. 1-3.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a request at a kernel to perform a file operation on a particular file;
   determining at the kernel that a flag bit associated with the file is set;
   invoking by the kernel a user space file handler to perform a particular action in user space when the flag bit is set;
   where invoking the user space file handler includes holding the operation and setting a time for the file handler to perform the action without setting any resource locks;
   where expiration of the set time without a request for further time results in the kernel performing the file operation;
   determining at the kernel whether notification has been received that the particular action has been performed by the file handler in user space; and
   allowing, at the kernel the file operation on the particular file when the notification is received.

2. The method of claim 1, where the file operation is a read file operation and the file hander requests the file data from a network location.

3. The method of claim 1, where the file operation is a modify file operation and the file handler copies the file prior to performing the modify file operation being performed.

4. The method of claim 1, further comprising:
   identifying i-node information for the file, where the i-node information includes one or more flag bits.

5. The method of claim 4, further comprising:
   when the flag bit is set, accessing extended attribute information associated with the file to identify special file handling operation to be performed by file handler.

6. The method of claim 5, wherein the extended attribute indicates that the particular file is to be backed up before the requested operation is performed.

7. The method of claim 5, wherein the extended attribute identifies a particular user space handler to be invoked, the particular user space handler being designated to perform particular operations.

8. The method of claim 1, wherein the flag bit associated with the file indicates that the file is an empty file and that the file data must be retrieved from a network location.

9. A system comprising:
   one or more computing devices operable to perform operations comprising:
   receiving a request at a kernel to perform a file operation on a particular file;
   determining at the kernel that a flag bit associated with the file is set;
   invoking by the kernel a user space file handler to perform a particular action in user space when the flag bit is set;
   where invoking the user space file handler includes holding the operation and setting a time for the file handler to perform the action without setting any resource locks;

where expiration of the set time without a request for further time results in the kernel performing the file operation;

determining at the kernel whether a notification has been received that the particular action has been performed by the file handler in user space; and allowing, at the kernel, the file operation on the particular file when the notification is received.

10. The system of claim 9, where the file operation is a read file operation and the file hander requests the file data from a network location.

11. The system of claim 9, where the file operation is a modify file operation and the file handler copies the file prior to performing the modify file operation being performed.

12. The system of claim 9, further operable to perform operations comprising:

identifying i-node information for the file, where the i-node information includes one or more flag bits.

13. The system of claim 12, further operable to perform operations comprising:

when the flag bit is set, accessing extended attribute information associated with the file to identify special file handling operation to be performed by file handler.

14. A non-transitory computer storage medium encoded with a computer program, the program comprising instructions that when executed by data processing apparatus cause the data processing apparatus to perform operations comprising:

receiving a request at a kernel to perform a file operation on a particular file;

determining at the kernel that a flag bit associated with the file is set;

invoking by the kernel a user space file handler to perform a particular action in user space when the flag bit is set;

where invoking the user space file handler includes holding the operation and setting a time for the file handler to perform the action without setting any resource locks:

where expiration of the set time without a request for further time results in the kernel performing the file operation;

determining at the kernel whether a notification has been received that the particular action has been performed by the file handler in user space; and allowing, at the kernel, the file operation on the particular file when the notification is received.

15. The non-transitory computer storage medium of claim 14, where the file operation is a read file operation and the file hander requests the file data from a network location.

16. The non-transitory computer storage medium of claim 14, where the file operation is a modify file operation and the file handler copies the file prior to performing the modify file operation being performed.

17. The non-transitory computer storage medium of claim 14, further operable to cause the data processing apparatus to perform operations comprising:

identifying i-node information for the file, where the i-node information includes one or more flag bits.

18. The non-transitory computer storage medium of claim 17, further operable to cause the data processing apparatus to perform operations comprising:

when the flag bit is set, accessing extended attribute information associated with the file to identify special file handling operation to be performed by file handler.

19. A method comprising:

receiving a request at a kernel to perform a file operation on a particular file;

determining at the kernel whether a prior operation has been performed on the file within a specified time period;

invoking by the kernel a user space file handler to perform a particular action in user space when no prior operation has been performed within the time period;

where invoking the user space file handler includes holding the operation and setting a time for the file handler to perform the action without setting any resource locks:

where expiration of the set time without a request for further time results in the kernel performing the file operation;

determining at the kernel whether a notification has been received that the particular action has been performed by the file handler in user space; and allowing, at the kernel, the file operation on the particular file when the notification is received.

20. The method of claim 19, wherein the request is a file modification and the particular action is to perform a copy of the file.

21. The method of claim 19, wherein the specified time period is one of a sequence of fixed time windows, wherein the action is performed on the file once during each window.

* * * * *

UNITED STATES PATENT AND TRADEMARK OFFICE
CERTIFICATE OF CORRECTION

PATENT NO. : 8,984,029 B2
APPLICATION NO. : 13/350047
DATED : March 17, 2015
INVENTOR(S) : Dominic B. Giampaolo et al.

It is certified that error appears in the above-identified patent and that said Letters Patent is hereby corrected as shown below:

Title Page, Item (56)

Page 4, Column 1, Line 1 (Other Publications), delete "("Linix" and insert -- ("Linux --, therefor.

Page 4, Column 1, Line 26 (Other Publications), delete "Wellesly" and insert -- Wellesley --, therefor.

Page 4, Column 2, Line 14 (Other Publications), delete "dtd" and insert -- dated --, therefor.

In the Claims

Column 10, Line 28, (Claim 1), delete "whether" and insert -- whether a --, therefor.

Column 10, Line 31, (Claim 1), delete "kernel" and insert -- kernel, --, therefor.

Column 10, Line 67, (Claim 9), delete "lock:" and insert -- locks; --, therefor.

Column 11, Line 37, (Claim 37), delete "lock:" and insert -- locks; --, therefor.

Column 12, Line 30, (Claim 19), delete "lock:" and insert -- locks; --, therefor.

Signed and Sealed this
Eighth Day of September, 2015

Michelle K. Lee
*Director of the United States Patent and Trademark Office*